(12) United States Patent
Lee (10) Patent No.: US 7,751,657 B2
(45) Date of Patent: Jul. 6, 2010

(54) INCLINOMETER SYSTEM

(76) Inventor: Geum Suk Lee, Seongju 4-beonji, Seongju-myeon, Boryeong-si, Chungcheongnam-do (KR) 355-910

( * ) Notice: Subject to any disclaimer, the term of this patent is extended or adjusted under 35 U.S.C. 154(b) by 0 days.

(21) Appl. No.: 12/489,578

(22) Filed: Jun. 23, 2009

(65) Prior Publication Data

US 2010/0067845 A1   Mar. 18, 2010

(30) Foreign Application Priority Data

Sep. 17, 2008   (KR) ...................... 10-2008-0090912
May 21, 2009   (KR) ...................... 10-2009-0044476

(51) Int. Cl.
*G02B 6/00*   (2006.01)
*G01B 11/26*   (2006.01)
*G01R 23/17*   (2006.01)
*G01P 15/13*   (2006.01)
*G01H 9/00*   (2006.01)

(52) U.S. Cl. .................. 385/12; 385/37; 356/139.1; 324/76.37; 73/514.26; 367/149

(58) Field of Classification Search ............... 385/12, 385/37; 356/139.1; 324/76, 37; 73/514.26, 73/514.29, 514.16, 514.27, 382 R, 382 G, 73/653; 367/149, 163; 250/227.19, 227.27

See application file for complete search history.

(56) References Cited

U.S. PATENT DOCUMENTS

| | | | | |
|---|---|---|---|---|
| 6,665,062 B2* | 12/2003 | Ferdinand et al. | ......... | 356/139.1 |
| 7,200,292 B2* | 4/2007 | Shang et al. | ................... | 385/13 |
| 7,222,534 B2* | 5/2007 | Maas et al. | .............. | 73/514.26 |
| 7,388,190 B2* | 6/2008 | Huang et al. | ........... | 250/227.14 |
| 2003/0095249 A1* | 5/2003 | Ferdinand et al. | ......... | 356/139.1 |
| 2005/0169568 A1* | 8/2005 | Shang et al. | ................... | 385/13 |
| 2007/0069115 A1* | 3/2007 | Huang et al. | ........... | 250/227.14 |

* cited by examiner

Primary Examiner—Brian M Healy
(74) Attorney, Agent, or Firm—Jae Y. Park; Kile Goekjian Reed & McManus

(57) ABSTRACT

Disclosed is an inclinometer system capable of detecting the inclination of the ground using a fiber bragg grating sensor to precisely measure the deformation of the ground. The inclinometer system includes at least one measuring unit, and the measuring unit includes a body provided therein with a receiving part, a frame inserted into the body, a weight member inserted in to the frame and having one end hinged to the frame, the weight member rotating in cooperation to inclination of the body, an optical fiber 5 passing through both the body and the frame such that one end of the optical fiber is fixed to the weight member, a fixing member installed into the frame to fix an opposite end of the optical fiber, and a fiber bragg grating (FBG) sensor attached to the optical fiber.

9 Claims, 13 Drawing Sheets

INCLINOMETER SYSTEM

CROSS-REFERENCE TO RELATED APPLICATION

This application claims priority from Korean Patent Application No. 10-2008-0090912 filed on Sep. 17, 2008, and Korean Patent Application No. 10-2009-0044476 filed on May 21, 2009, the contents of which are herein incorporated by reference in their entirety.

BACKGROUND OF THE INVENTION

1. Field of the Invention

The present invention relates to an inclinometer system. More particularly, the present invention relates to an inclinometer system capable of detecting the inclination of the ground using a fiber bragg grating sensor to precisely measure the deformation of the ground.

2. Description of the Related Art

It is necessary to inspect the displacement of civil engineering structures, such as roads, tunnels, bridges, and dams, an inclined plane, an incision cliff, a subway construction site, and underground foundation work for skyscrapers, or the ground subsidence displacement of a reclamation land and a soft ground by detecting the displacement of the structures or the sidewalls according to the design standard for the structures or construction techniques used in the construction sites.

Generally, there are many measurement devices employing inclinometer sensors used for civil engineering. The measurement devices have various external appearances suitable for various civil engineering construction sites. For instance, the measurement device is buried in the ground or attached to the civil engineering structure by inputting the measurement device including inclinometer sensors, which have a predetermined length and assembled with each other using bolts, into an inclinometer casing. In a civil engineering field, the inclination displacement of the inclinometer sensor is converted into length (mm) to find the tilt degree of the civil engineering structure or the degree of ground subsidence, and such data are utilized to determine the stability of a civil engineering site.

Hereinafter, description will be made regarding the installation of a conventional representative inclinometer system for a civil engineering structure used in a civil engineering site.

Figure 1:
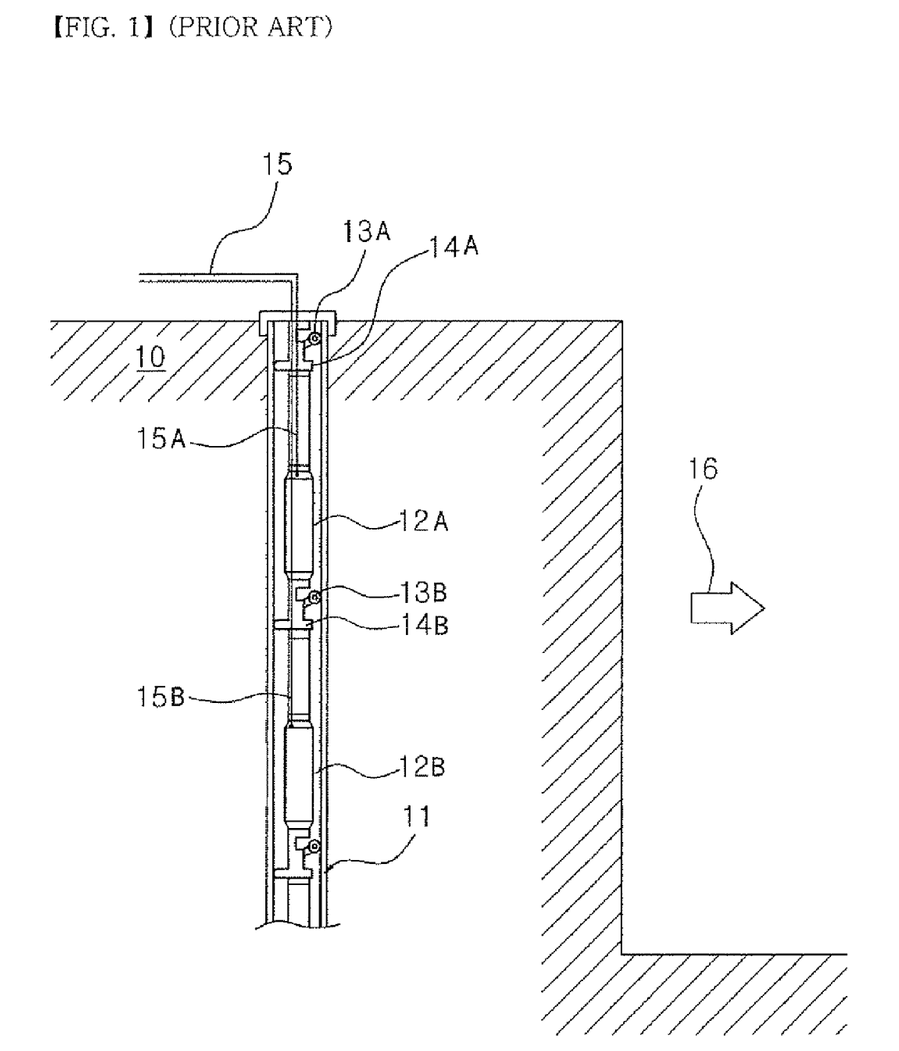
FIG. 1 is a sectional view showing a conventional inclinometer system buried in the ground.

FIG. 1 is a sectional view showing the conventional inclinometer system buried in the ground.

As shown in FIG. 1, in order to measure the inclination of a ground 10, after burring a single inclinometer casing 11 in the ground 10, a plurality of inclinometer sensors 12A and 12B are pushed into the inclinometer casing 11 using a plurality of sensor rollers 13A and 13B attached thereto while the inclinometer sensors 12A and 12B are being connected to each other using a plurality of bolts 14A and 14B. The inclinometer casing 11 is formed by connecting unit pipes having a length of about 3 m with each other, and substantially forms a single pipe.

Accordingly, after the conventional inclinometer system detects lateral underground displacement 16 using inclinometer sensors 12A and 12B, the inclinometer system collects measured data through a plurality of cables 15A and 15B exposed to the outside of the sensors 12A and 12B to determine the underground displacement.

However, the conventional inclinometer system or a ground subsistence measuring system has a very complicated structure, and is difficult to be installed. In detail, only the single inclinometer casing 11 is used to measure the inclination and the subsidence of the ground 10. Accordingly, the inclinometer system indirectly measures the inclination degree of the inclinometer casing by allowing the inclinometer sensors 12A and 12B to detect the displacement of the inclinometer casing transferred through the sensor rollers 13A and 13B in contact with internal grooves of the inclinometer casing. Therefore, the measured inclination degree of the inclinometer casing makes a great difference from an actual displacement of the inclinometer casing.

SUMMARY OF THE INVENTION

Accordingly, the present invention has been made to solve the above-mentioned problems occurring in the related art.

An object of the present invention is to provide an inclinometer system capable of measuring fine inclination displacement by using a fiber bragg grating sensor, so that precision of the inclinometer system can be improved.

In order to accomplish the object of the present invention, it is one aspect of the present invention to provide an inclinometer system including at least one measuring unit. The measuring unit includes a body provided therein with a receiving part, a frame inserted into the body, a weight member inserted into the frame and having one end hinged to the frame, the weight member rotating in cooperation to inclination of the body, an optical fiber 5 passing through both the body and the frame such that one end of the optical fiber is fixed to the weight member, a fixing member installed into the frame to fix an opposite end of the optical fiber, and a fiber bragg grating (FBG) sensor attached to the optical fiber.

As described above, according to the present invention, the inclinometer system can measure fine inclination displacement and temperature variation by using a fiber bragg grating sensor, so that precision of the inclinometer system can be improved. In addition, maintenance and repair work for the inclinometer system can be simplified.

DETAILED DESCRIPTION OF THE PREFERRED EMBODIMENTS

Hereinafter, a preferred embodiment of the present invention will be described in detail with reference to accompanying drawings.

Figure 2:
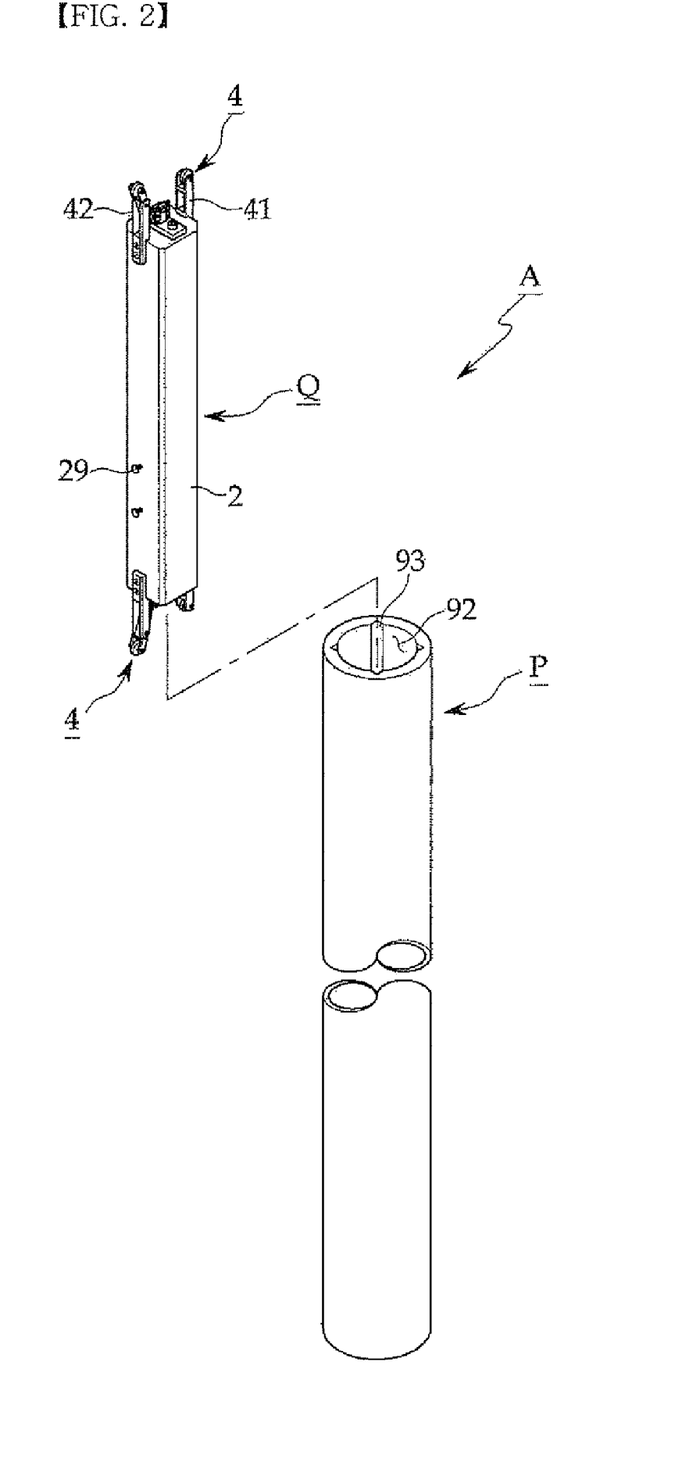
FIG. 2 is an exploded perspective view showing an inclinometer system according to the present invention.

FIG. 2 is an exploded perspective view showing an inclinometer system A.

As shown in FIG. 2, the inclinometer system A according to the present invention includes a guide pipe P buried in the ground, and a measuring unit Q inserted into the guide pipe P.

The guide pipe P is an ABS pipe provided therein with a passage 92. The guide pipe P has a plurality of rail grooves 93 formed at an inner peripheral surface thereof in a longitudinal direction.

Each rail groove 93 has a triangle or rectangular sectional surface.

Figure 3:
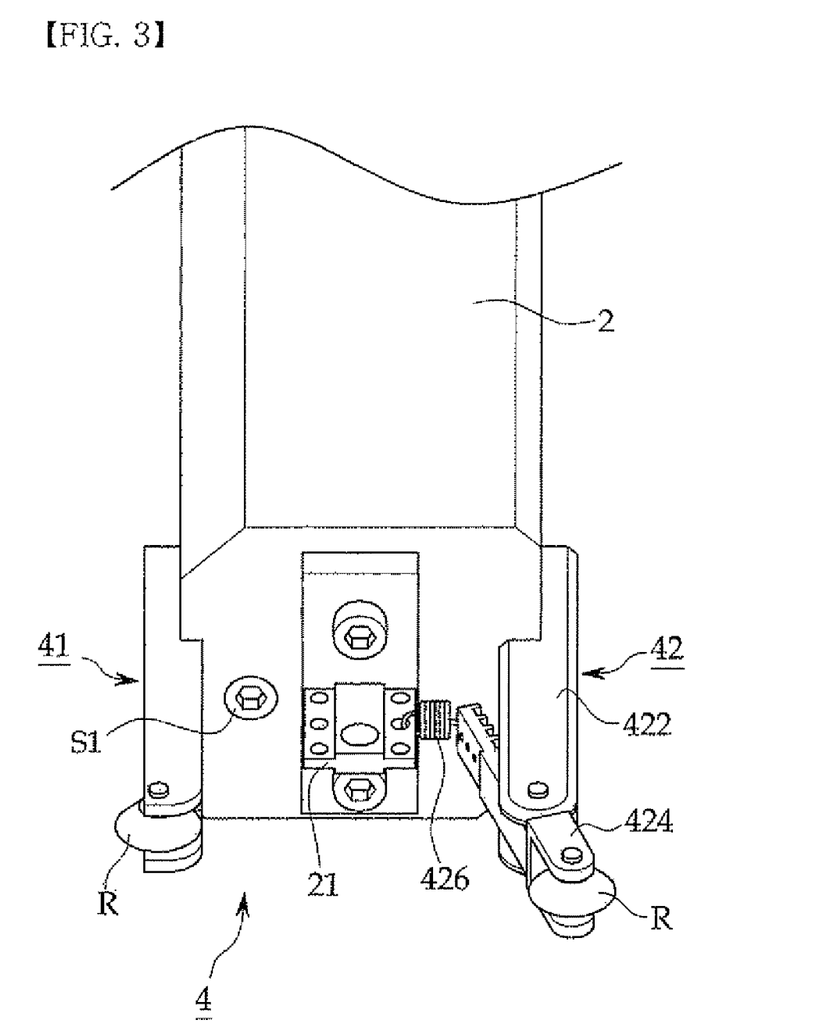
FIG. 3 is an enlarged view showing a portion of a measuring unit of the inclinometer system according to the present invention.
Figure 4:
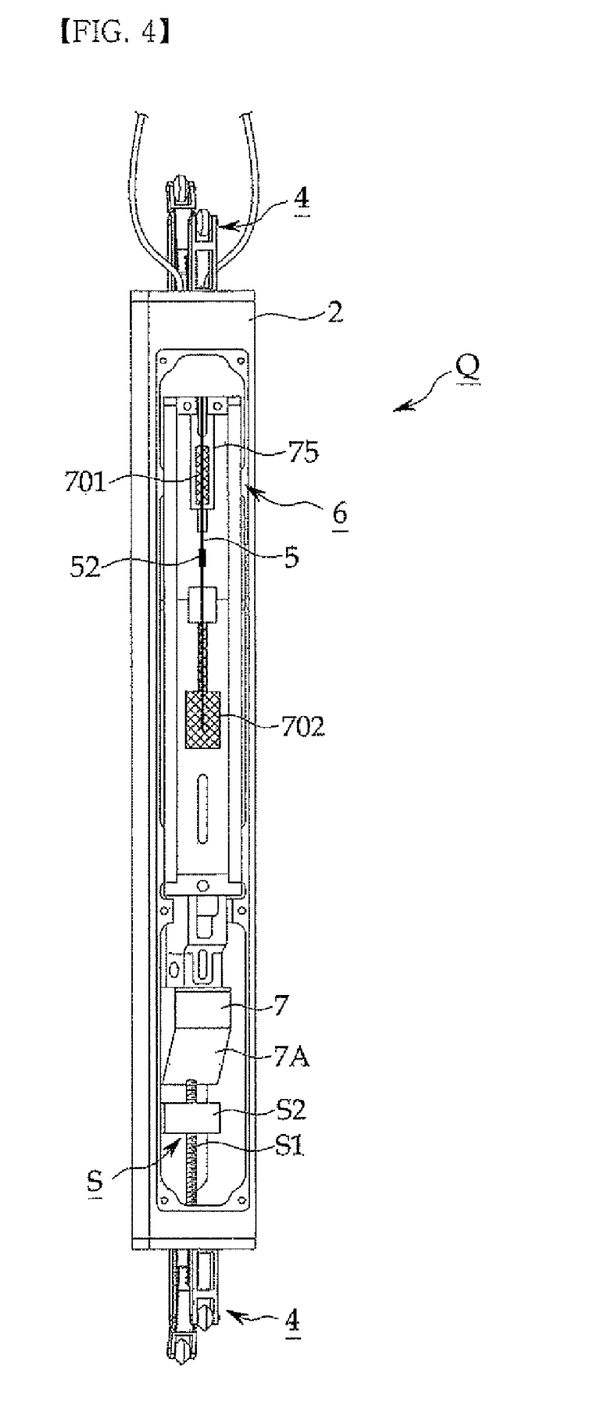
FIG. 4 is a plan view showing the measuring unit of the inclinometer system according to the present invention.
Figure 5:
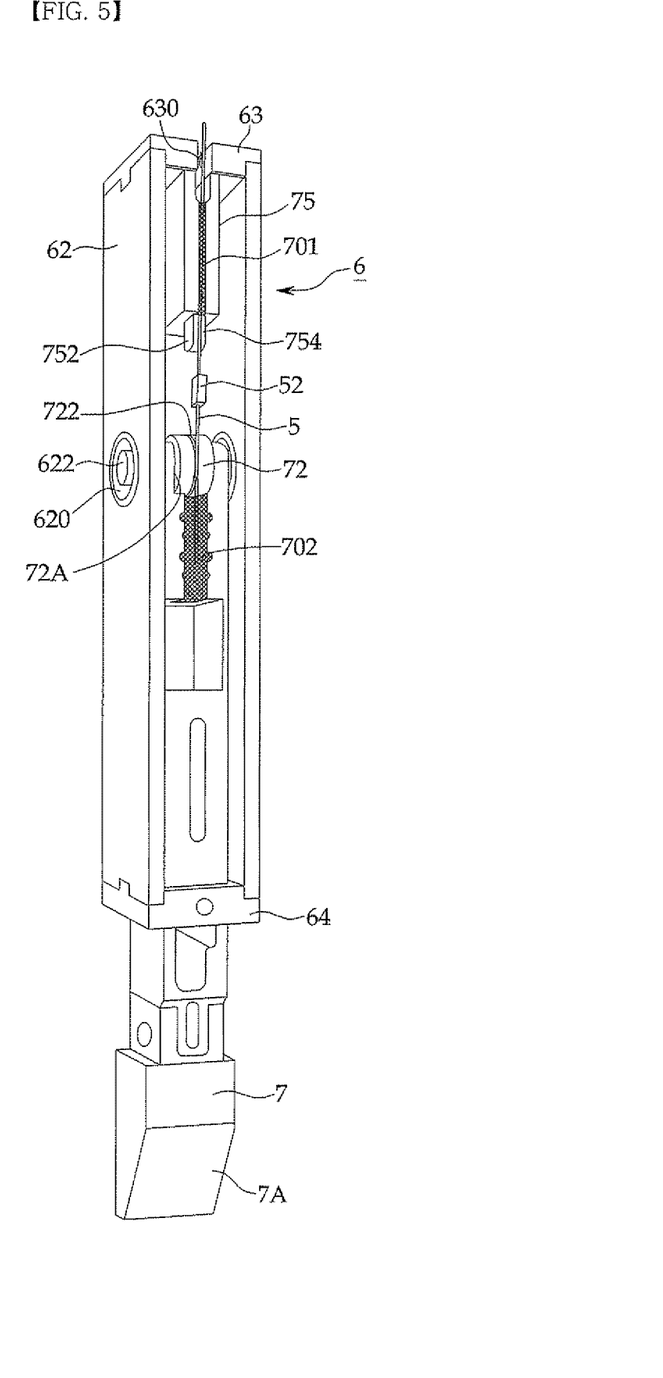
FIG. 5 is a perspective view showing the measuring unit according to the present invention.

FIG. 3 is an enlarged view showing the measuring unit Q of the inclinometer system A according to the present invention, and FIG. 4 is a plan view showing the measuring unit Q of the inclinometer system A according to the embodiment. FIG. 5 is a view showing a frame 6 provided in the measuring unit Q according to the present invention.

As shown in FIGS. 3 to 5, the measuring unit Q includes a body 2, which is provided therein with a receiving part, the frame 6, which is inserted into the body 2, a weight member 7, which is inserted into the frame 6 such that one end of the weight member 7 is hinged to the frame 6 and rotates as the body 2 is inclined, an optical fiber 5, which passes through both the body 2 and the frame 6 such that one end of the optical fiber 5 is fixed to the weight member 7, a fixing member 75, which is installed in the frame 6 to fix the other end of the optical fiber 5, and a fiber bragg grating (FBG) sensor 52 attached to the optical fiber 5.

Elastic support members 4 are mounted on at both ends of the body 2, so that the body 2 can be inserted into the guide pipe P while being elastically supported to the inner circumferential surface of the guide pipe P.

Screws 29 are coupled with one side of the body 2 to adjust the position of the weight member 7 (see FIG. 2).

In other words, when each screw 29 is fastened such that a front end of each screw 29 is pushed, the tension state of the optical fiber 5 is changed to adjust sensitivity. Details thereof will be made later.

As shown in FIG. 3, each elastic support member 4 includes first and second support rods 41 and 42 which protrude from both ends of the body 2. The first support rod 41 is provided at a front end thereof with a roller R. The second support rod 42 faces the first support rod 41 and is provided at a front end thereof with the roller R.

The roller R has a disc shape. Preferably, the roller R has the shape of a bead on an abacus thickness of which is thinned toward ends from the center thereof. The roller R is coupled with the rail groove 93 of the guide pipe P and rolled so that the body 2 is inserted into the guide pipe P.

The second support rod 42 includes an upper leg 422 having the same length as that of the first support rod 41 and a middle leg 424 hinged to an end of the upper leg 422. One end of the middle leg 424 is coupled with the body 2 by using a spring 426. The roller R is installed on the other end of the middle leg 424.

One end of the spring 426 is coupled with a bracket 21 installed at the body 2, and the other end of the spring 426 is coupled with the middle leg 424, so that the one end of the middle leg 424 is always hauled to the body 2. Accordingly, the other end of the middle leg 424 and the roller R are biased outward.

Therefore, the roller R can closely make contact with the rail groove 93 of the guide pipe P.

Accordingly, the roller R is supported in the rail groove 93 of the guide pipe P, so that the spring 426 is lengthened. As a result, the roller R can stably move because the roller R securely makes contact with the rail groove 93.

As shown in FIG. 5, the frame 6 includes side plates 62 provided at both sides of the frame 6 and top and bottom plates 63 and 64 covering both ends of the side plates 62 so that the frame 6 has a rectangular hollow body having a space therein with open front and rear surfaces.

Hinge holes 620 are formed at the side plates 62 provided at both sides of the frame 6. The hinge holes 620 are coupled with a shaft pin 622.

The bottom plate 64 is provided therein with a through hole 643 into which the weight member 7 is inserted.

The side plates 62 and the top and bottom plates 63 and 64 are made of materials having different thermal expansion coefficients.

In detail, the side plates 62 of the frame 6 is made of iron, and the top and bottom plates 63 and 64 of the frame 6 are made of aluminum.

As the temperature increases, the top and bottom plates 63 and 64 are expanded. At this timer since outer peripheral portions of the top and bottom plates 63 and 64 are fixed to the side plates 62, middle portions of the top and bottom plates 63 and 64 are recessed inward.

In this case, the FBG sensor 52 is vertically pressed so that the FBG sensor 52 is contracted. This is because both ends of the optical fiber 5 are fixed to the top and bottom plates 63 and 4.

In addition, as a temperature is increased, the side plates 62 are expanded in upper and lower directions.

The expansion force of the top and bottom plates 63 and 64 is compensated by the expansion force of the side plates 62, so that the optical fiber 5 is not deformed. Accordingly, the FBG sensor 52 maintains the shape thereof without being contracted.

As shown in FIG. 5, a through hole 630 is formed in the top plate 63 such that the optical fiber 5 passes through the through hole 630, and an upper end of the fixing member 75 is fixed to an inner surface of the top plate 63.

The fixing member 75 is made of aluminum and has the shape of a rod having a predetermined length.

The fixing member 75 is provided at an outer surface thereof with an adhesive injecting groove 701 and provided at a lower end thereof with a protrusion 752.

The protrusion 752 is provided at an outer surface thereof with a linear-type guide groove 754 provided in a line with the adhesive injecting groove 701.

Accordingly, the optical fiber 5 is inserted into both the adhesive injecting groove 701 and the guide groove 754 such that the optical fiber 5 can be linearly provided.

As shown in FIG. 5, the weight member 7 is made of metal material, provided at an upper end thereof with a hinge part 72 having an insertion hole 72A communicating with the hinge holes 620 of the side plates 62, and provided at a lower portion thereof with an inclined surface 7A.

The hinge part 72 is provided at an outer surface thereof with a slit 722 formed in a linear line with the guide groove 754 such that the optical fiber 5 passes through the slit 722.

The weight member 7 is provided at the upper portion thereof with an adhesive injecting hole 702 to adhesively fix a lower end of the optical fiber 5.

The hinge part 72 of the weight member 7 is made of aluminum, and the remaining portion of the weight member 7 is made of alloy of brass.

The protrusion 752 of the fixing member 75, and the hinge part 72 of the weight member 7 have rounded surfaces. Accordingly, when the weight member 7 rotates so that the optical fiber 5 is bent, the optical fiber 5 is not damaged.

Figure 6:
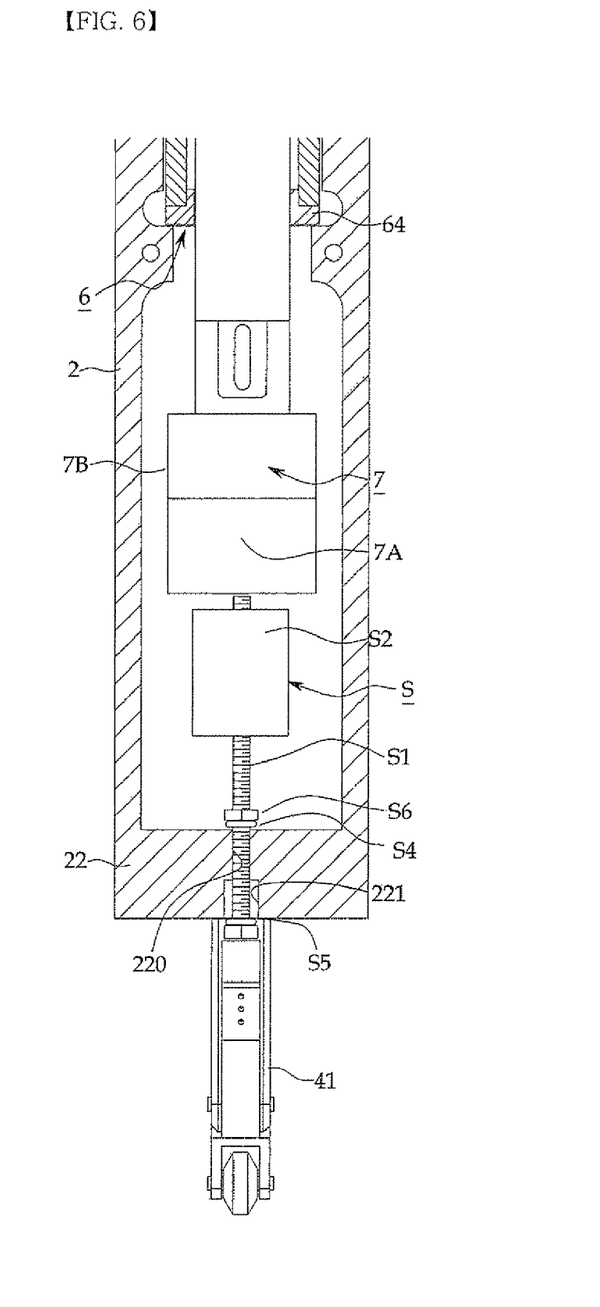
FIG. 6 is a sectional pine view showing an internal portion of the inclinometer system according to the present invention.
Figure 7:
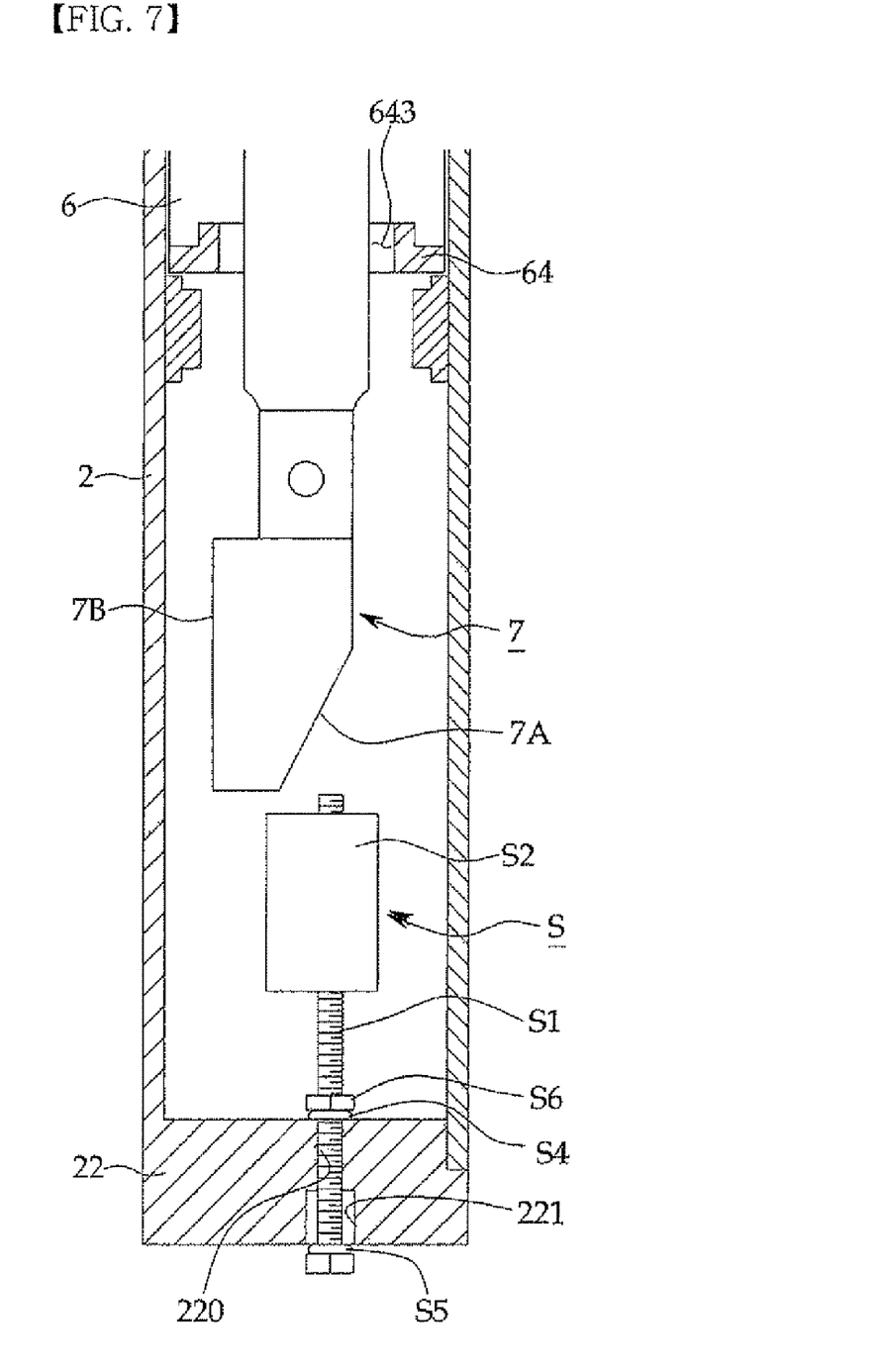
FIG. 7 is a sectional side view showing the internal portion of the inclinometer system according to the present invention.

FIG. 6 is a sectional plan view showing an internal portion of the inclinometer system according to the present invention, and FIG. 7 is a sectional side view showing the internal portion of the inclinometer system according to the present invention.

As shown in FIGS. 4, 6, and 7, the inclinometer system further includes a fixing unit S to prevent the weight member 7 from being moved.

In other words, the fixing unit S presses the inclined surface 7A of the weight member 7 such that an opposite surface 7B of the inclined surface 7A closely makes contact with an inner wall of the body 2, thereby maintaining the fixing state of the weight member 7. Accordingly, the optical fiber 5 and the FBG sensor 52 are not damaged by shake or shock when the inclinometer system is carried.

The fixing unit S has a structure in which a support member S2 presses the weight member 7 by fastening a screw S1, so that the support member S2 fixes the weight member 7 in the close contact with the weight member 7.

As shown in FIG. 6, the fixing unit S includes the screw S1 screwed with a hole 220 of a lower end surface 22 of the body 2, the support member S2 screwed with a front portion of the screw S1 and making contact with an outer surface of the weight member 7, inner and outer packings S4 and S5 screwed with the screw S1 while closely making contact with upper and lower portions of the hole 220, and a nut S6 screwed with the screw S1 and interposed between the inner packing S4 and the support member S2.

A packing hole 221 having a greater diameter than that of the hole 220 is formed at a lower part of the hole 220 such that the outer packing S5 can be inserted into the packing hole 221.

Figure 8:
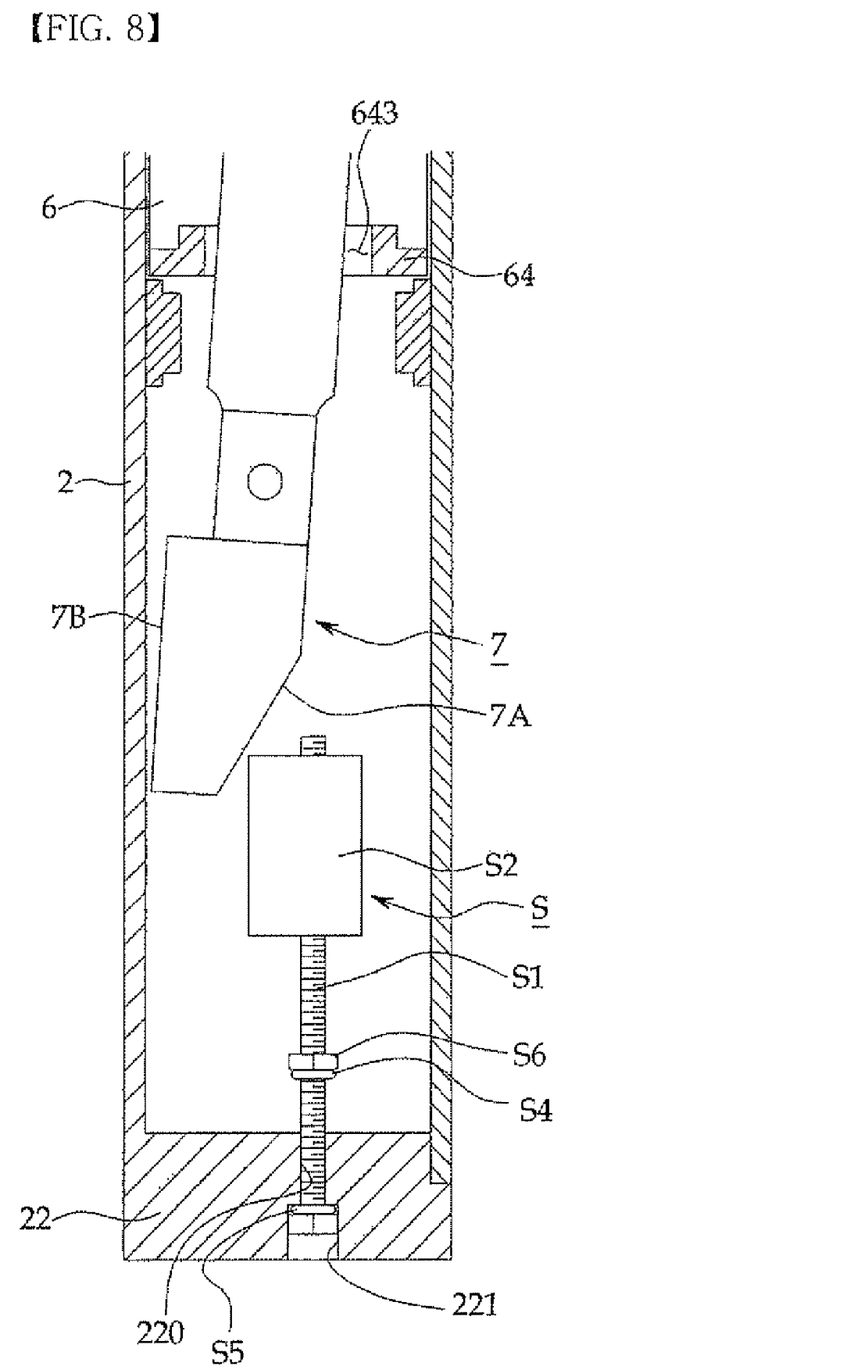
FIGS. 8 and 9 are sectional side views showing the operation of the fixing unit of the inclinometer system according to the present invention.
Figure 9:
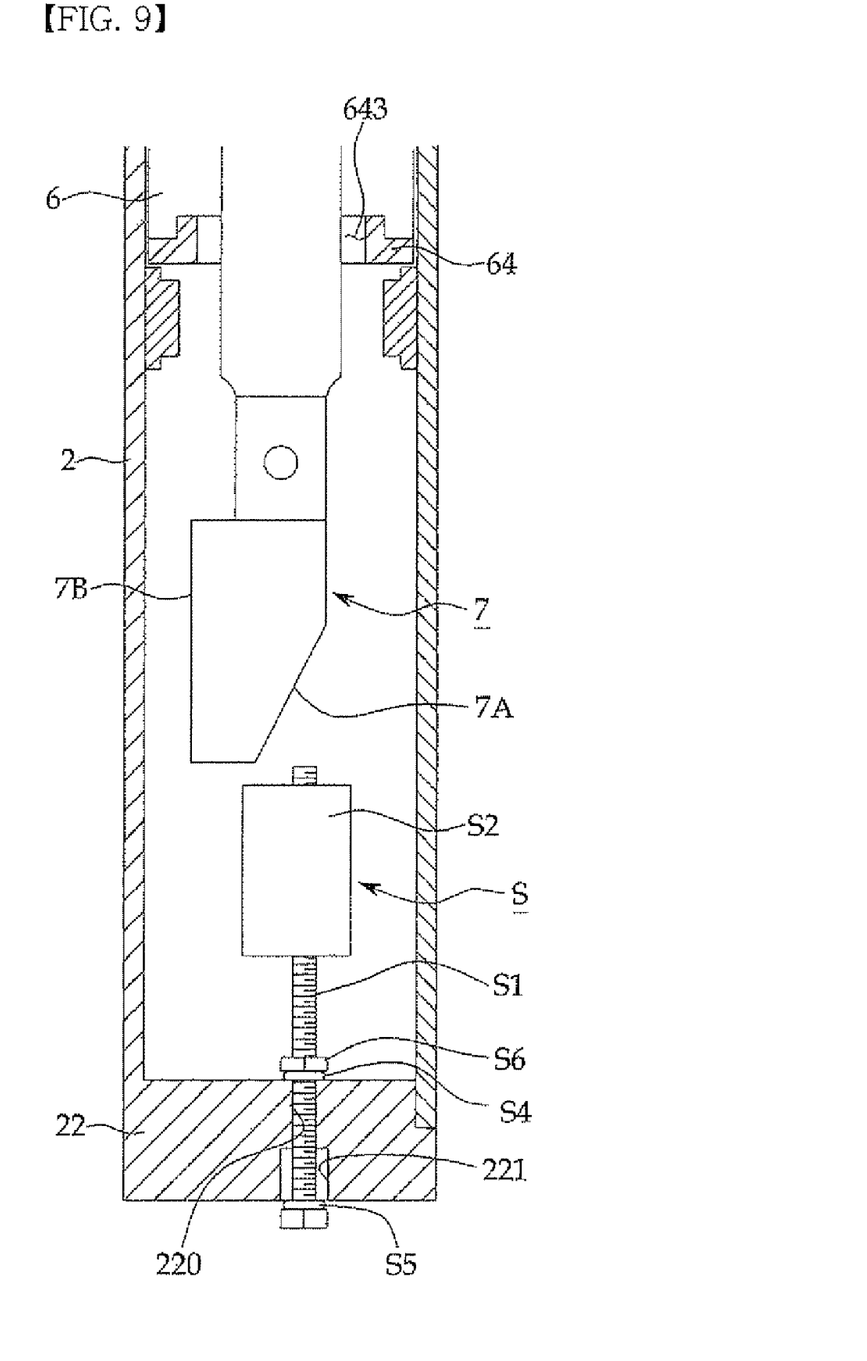

FIGS. 8 and 9 are sectional side views showing the operation of the fixing unit S of the inclinometer system according to the present invention.

As shown in FIG. 8, when the screw S1 rotates clockwise, the support member S2 moves up to closely make contact with the inclined surface 7A of the weight member 7. Accordingly, the weight member 7 closely makes contact with the inner wall of the body 2, so that the weight member 7 is fixed.

The outer packing S5 of the screw S1 is inserted into the packing hole 221 such that the outer packing S5 closely makes contact with the packing hole 221. According, water proof is achieved in the packing hole 221.

Thus, since the weight member 7 is fixed, the optical fiber 5 is not moved due to shock when the inclinometer system is carried. Accordingly, the optical fiber 5 is not damaged nor deformed.

Thereafter, as shown in FIG. 9, when the screw S1 rotates counterclockwise, the support member S2 moves down so that the support member S2 is separated from the weight member 7. Accordingly, the weight member 7 is released.

The inner packing S4 of the screw S1 closely makes contact with the upper portion of the hole 220, so that a water proof state is maintained.

Figure 10:
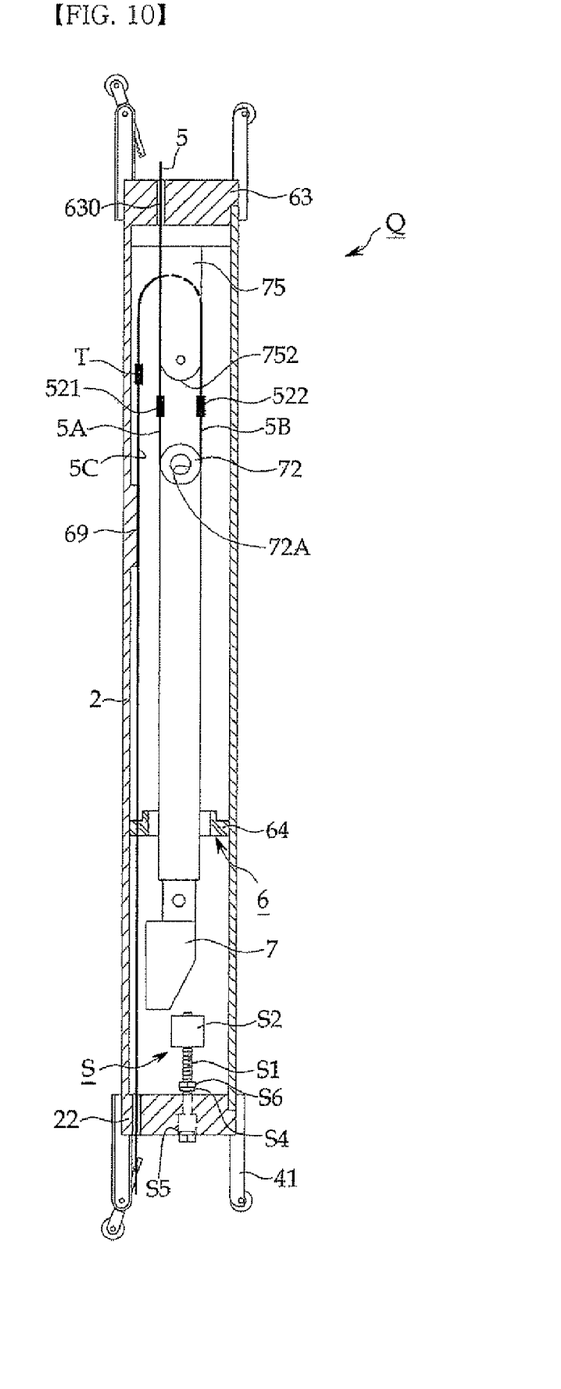
FIG. 10 is a sectional side view showing an inclinometer system according to another embodiment of the present invention.

According to another embodiment of the present invention, a temperature-compensating FBG sensor T is additionally provided on the optical fiber 5 with the FBG sensor 52.

The optical fiber 5 can be deformed according to the variation of external conditions such as strength or temperature. The temperature-compensating FBG sensor T measures the actual strain rate of the ground under various thermal conditions.

When the inclinometer system further includes both the FBG sensor 52 and the temperature-compensating FBG sensor T, the optical fiber 5 is divided into several strands.

FIG. 10 is a sectional side view showing the inclinometer system according to another embodiment of the present invention.

As shown in FIG. 10, after the optical fiber 5 is inserted into the through hole 630 of the top plate 63, the optical fiber 5 passes through the fixing member 75, and then passes around the hinge part 72. Next, after the optical fiber 5 is moved upward and bent, the optical fiber 5 is moved downward and withdrawn through the bottom plate 64. Accordingly, the optical fiber 5 has three straight portions.

In this case, the optical fiber 5 is bent upward at an outer portion of the fixing member 75.

In addition, a first FBG sensor 521 is attached to a first strand 5A of the optical fiber 5, in which the first strand 5A extends beyond the fixing member 75 through the top plate 63. A second FBG sensor 522 is attached to a second strand 5B of the optical fiber 5 extending upward after passing around the hinge part 72.

The temperature-compensating FBG sensor T is attached to a third strand 5C of the optical fiber 5 that moves downward after being bended at the upper portion of the fixing member 75.

A portion of the third strand 5C, which is located after the temperature-compensating FBG sensor T, adheres to an internal surface of the side plate 62 of the frame 6. In order to facilitate the adhesion between the third strand 5C and the internal surface of the body 2, a protrusion 69 protrudes from the internal surface of the body 2.

Figure 12:
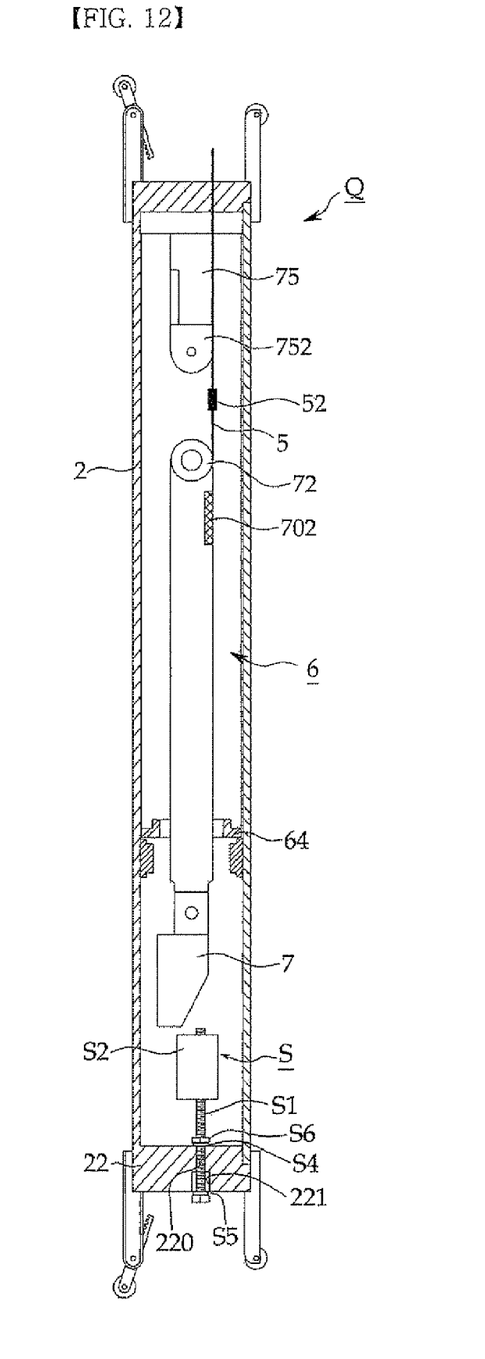
FIG. 12 is a view showing the inclinometer system according to the present invention when underground displacement does not occur.

Meanwhile, as shown in FIG. 12, a single strand of the optical fiber 5 can be prepared, such that the lower end of the optical fiber 5 is fixed to the hinge part 72. In this case, one FBG sensor 52 is attached to the optical fiber 5.

Hereinafter, the assembly and the operational of the inclinometer system according to the present invention will be described in detail.

The following description is about a single strand of the optical fiber 5 and one FBG sensor 52. Details about several strands (i.e., three strands) of the optical fiber 5 have been made above.

The frame 6 is formed by the side plates 62 and the upper and lower plates 63 and 64. Before the bottom plate 64 is assembled, the hinge part 72 of the weight member 7 is inserted into the frame 6 through the opening. Then, after the insertion hole 72A of the hinge part 72 is coincident with the hinge hole 620 of the side plate 62, the shaft pin 622 is coupled with the hinge hole 620, and then the bottom plate 64 is assembled.

Then, after the optical fiber 5 passes through the through hole 630 of the top plate 63, the optical fiber 5 is inserted into the guide groove 754 of the fixing member 75. Thereafter, the lower end of the optical fiber 5 is inserted into the adhesive injecting hole 702 through the slit 722 formed in the hinge part 72 of the weight member 7, and an adhesive is injected into the adhesive injecting hole 702 so that the lower end of the optical fiber 5 is fixed.

An adhesive is also injected into the adhesive injecting hole 701 of the fixing member 75 so that the optical fiber 5 is fixed.

The assembled frame 6 is fitted into the receiving part of the body 2 so that the frame 6 is securely fixed. Preferably, fastening tools, such as screws, are not used for the frame 6 in order to maintain a tensile force of the frame 6 according to the temperature variation.

Thereafter, the screws 29 of the body 2 are released or fastened such that the front end of the screws 29 pushes the weight member 7 thereby setting a desirable angle. In such a manner, the measuring unit Q according to the present invention is completely assembled.

Figure 11:
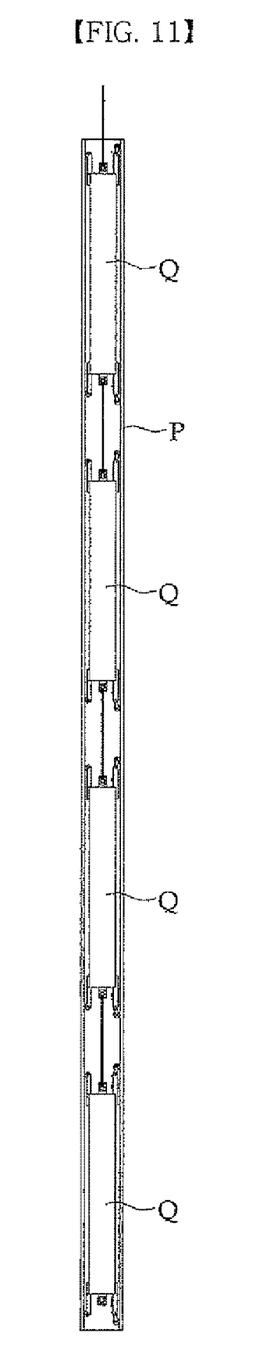
FIG. 11 is a view showing the installation of the inclinometer system according to the present invention.

FIG. 11 is a view showing the installation of the inclinometer system according to the present invention.

As shown in FIG. 11, after an insertion hole is formed in the ground by boring the ground, the guide pipe P is inserted into the insertion hole.

Thereafter, a plurality of measuring units Q is inserted into the guide pipe P.

As shown in FIGS. 2 and 3, the roller R of the elastic support member 4 of the body 2 is inserted into the rail groove 93 and then pushed in the guide pipe P.

If the inner diameter of the guide pipe P is smaller, the second support rod 42 is relatively biased inward. In addition, if the inner diameter of the guide pipe P is greater, the second support rod 42 is relatively biased outward. Accordingly, the second support rod 42 is always supported on the inner wall of the guide pipe P while maintaining desirable elasticity, so that the measuring unit Q is not affected by the shake of the inclinometer system.

Figure 13:
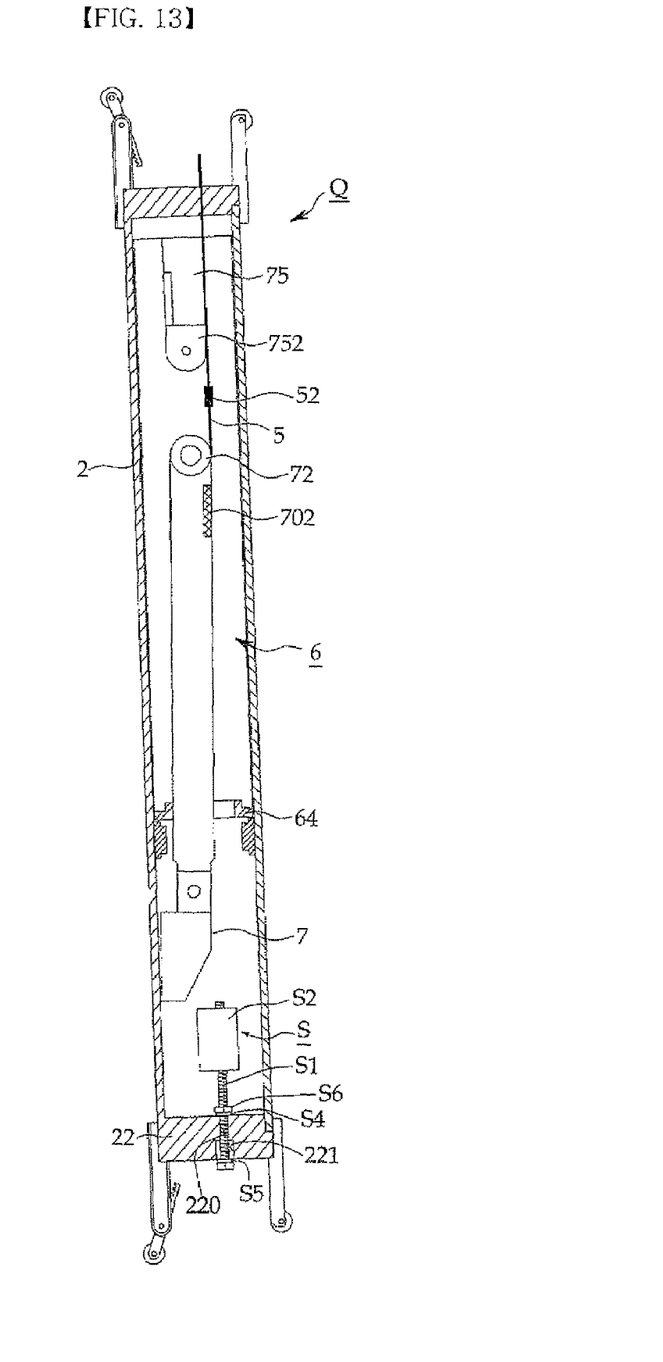
FIG. 13 is a view showing the inclinometer system according to the present invention when the underground displacement occurs.

FIG. 12 is a view showing the inclinometer system according to the present invention when underground displacement does not occur, and FIG. 13 is a view showing the inclinometer system according to the present invention when the underground displacement occurs. As shown in FIGS. 12 and 13, a single strand of the optical fiber 5 and one FBG sensor 52 are installed.

As shown in FIG. 13, when the underground displacement occurs, the weight member 7 rotates clockwise or counterclockwise about the hinge part 7, so that the optical fiber 5 is extended or contracted. The FBG sensor 52 detects the displacement of the optical fiber 5 to transmit the displacement to a measuring part through a transmit cable.

Accordingly, the displacement can be detected by the measuring part.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An inclinometer system comprising:
   at least one measuring unit,
   wherein the measuring unit includes:
   a body provided therein with a receiving part;
   a frame inserted into the body;
   a weight member inserted into the frame and having one end hinged to the frame, the weight member rotating in cooperation to inclination of the body;
   an optical fiber passing through both the body and the frame such that one end of the optical fiber is fixed to the weight member;
   a fixing member installed into the frame to fix an opposite end of the optical fiber; and
   a fiber bragg grating (FBG) sensor attached to the optical fiber,
   wherein the frame includes:
   side plates provided at a middle portion thereof with hinge holes communicating to each other;
   a top plate provided with a through hole such that the optical fiber passes through the through hole, having an inner surface onto which one end of the fixing member is fixed, and covering an end of the side plates; and
   a bottom plate provided therein with a through hole into which the weight member is inserted.

2. The inclinometer system of claim 1, wherein the weight member includes a metallic rectangular body,
   the weight member is provided at an upper portion thereof with a first adhesive injecting hole to adhesively fix a lower end of the optical fiber and provided at a lower portion thereof with an inclined surface,
   the weight member is provided at an upper end thereof with a hinge part,
   the hinge part is provided at a middle portion thereof with an insertion hole communicating with the hinge holes of the side plates, and
   the hinge part is provided at an outer surface thereof with a slit formed in a linear line with a guide groove of the fixing member such that the optical fiber passes through the slit.

3. An inclinometer system comprising:
   at least one measuring unit,
   wherein the measuring unit includes:
   a body provided therein with a receiving part;
   a frame inserted into the body;
   a weight member inserted into the frame and having one end hinged to the frame, the weight member rotating in cooperation to inclination of the body;
   an optical fiber passing through both the body and the frame such that one end of the optical fiber is fixed to the weight member;
   a fixing member installed into the frame to fix an opposite end of the optical fiber; and
   a fiber bragg grating (FBG) sensor attached to the optical fiber,
   wherein the fixing member includes aluminum,
   the fixing member is provided at an outer surface thereof with a second adhesive injecting groove into which an adhesive is injected, and
   the fixing member has a protrusion provided at an outer surface thereof with a linear-type guide groove provided in a linear line with the second adhesive injecting.

4. The inclinometer system of claim 2, wherein the hinge part of the weight member includes aluminum, and a remaining part of the weight member includes brass.

5. The inclinometer system of claim 1, wherein the side plates of the frame include iron, and the top and bottom plates and include aluminum.

6. An inclinometer system comprising:
   at least one measuring unit,
   wherein the measuring unit includes:
   a body provided therein with a receiving part;
   a frame inserted into the body;
   a weight member inserted into the frame and having one end hinged to the frame, the weight member rotating in cooperation to inclination of the body;
   an optical fiber passing through both the body and the frame such that one end of the optical fiber is fixed to the weight member;
   a fixing member installed into the frame to fix an opposite end of the optical fiber; and
   a fiber bragg grating (FBG) sensor attached to the optical fiber, further comprising a guide pipe provided therein with at least of measuring units and buried in ground,
wherein the body includes elastic support members elastically supported on an inner circumferential surface of the guide pipe,
wherein each elastic support member includes:
a first support rod installed at one side of at least one end of the guide pipe and provided at a front end thereof with a roller; and
a second support rod provided at a front end thereof with the roller while facing the first support rod.

7. The inclinometer system of claim 6, wherein the second support rod includes:
an upper leg having a length identical to a length of the first support rod; and
a middle leg hinged to an end of the upper leg, and one end of the middle leg is coupled with the body by using a spring.

8. An inclinometer system comprising:
at least one measuring unit,
wherein the measuring unit includes:
a body provided therein with a receiving part;
a frame inserted into the body;
a weight member inserted into the frame and having one end hinged to the frame, the weight member rotating in cooperation to inclination of the body;
an optical fiber passing through both the body and the frame such that one end of the optical fiber is fixed to the weight member;
a fixing member installed into the frame to fix an opposite end of the optical fiber; and
a fiber bragg grating (FBG) sensor attached to the optical fiber,
further comprising a fixing unit to fix the weight member,
wherein the fixing unit includes:
a screw screwed with a hole formed in a lower end surface of the body;
a support member screwed with a front portion of the screw and making contact with an outer surface of the weight member;
inner and outer packings S4 and S5 screwed with the screw and closely making contact with an upper portion and a lower portion of the hole; and
a nut screwed with the screw and interposed between the inner packing and the support member.

9. An inclinometer system comprising:
at least one measuring unit,
wherein the measuring unit includes:
a body provided therein with a receiving part;
a frame inserted into the body;
a weight member inserted into the frame and having one end hinged to the frame, the weight member rotating in cooperation to inclination of the body;
an optical fiber passing through both the body and the frame such that one end of the optical fiber is fixed to the weight member;
a fixing member installed into the frame to fix an opposite end of the optical fiber; and
a fiber bragg grating (FBG) sensor attached to the optical fiber,
wherein the optical fiber includes first to third strands,
the first and second FBG sensors are attached to the first and second strands of the optical fiber, and
a temperature-compensating FBG sensor is attached to a remaining one strand of the optical fiber.

* * * * *